United States Patent [19]

Meunier et al.

[11] Patent Number: 5,050,027
[45] Date of Patent: Sep. 17, 1991

[54] MAGNETIC RECORDING/PLAYBACK HEAD WITH ABRASION-RESISTING LAYER

[75] Inventors: Paul L. Meunier, Paris; Jean C. Lehureau, Ste Genevieve des Bois; Jean L. Rolland, Paris, all of France

[73] Assignee: Thomson-CSF, Puteaux, France

[21] Appl. No.: 377,831

[22] PCT Filed: Oct. 21, 1988

[86] PCT No.: PCT/FR88/00516
§ 371 Date: Jun. 27, 1989
§ 102(e) Date: Jun. 27, 1989

[87] PCT Pub. No.: WO89/04039
PCT Pub. Date: May 5, 1989

[30] Foreign Application Priority Data
Oct. 27, 1987 [FR] France .................. 87 14823

[51] Int. Cl.$^5$ .................. G11B 5/193; G11B 5/31
[52] U.S. Cl. .................. 360/122; 360/126
[58] Field of Search .................. 360/122, 126

[56] References Cited

U.S. PATENT DOCUMENTS

4,644,431 2/1987 Kishine et al. .................. 360/122
4,849,842 7/1989 Meunier et al. .................. 360/122

FOREIGN PATENT DOCUMENTS

241371 10/1987 European Pat. Off. .
2474219 7/1981 France .
60-191407 9/1985 Japan .
61-29409 2/1986 Japan .

OTHER PUBLICATIONS

Patent Abstracts of Japan, vol. 10, No. 180 (P-471) (2236), Jul. 24, 1986.
Patent Abstracts of Japan, vol. 10, No. 45 (P-430) (2102), Feb. 21, 1986.

Primary Examiner—Robert S. Tupper
Attorney, Agent, or Firm—Oblon, Spivak, McClelland, Maier & Neustadt

[57] ABSTRACT

Magnetic head structure, including a layer (S1, S2) of a material, such as Sendust, deposited on the magnetic poles and a carbon-based layer (C1) deposited on the preceding layer. The layer (S1, S2) made of magnetic material which has a high coefficient of bonding relative to the magnetic poles and to the carbon-based layer.

8 Claims, 2 Drawing Sheets

FIG_1
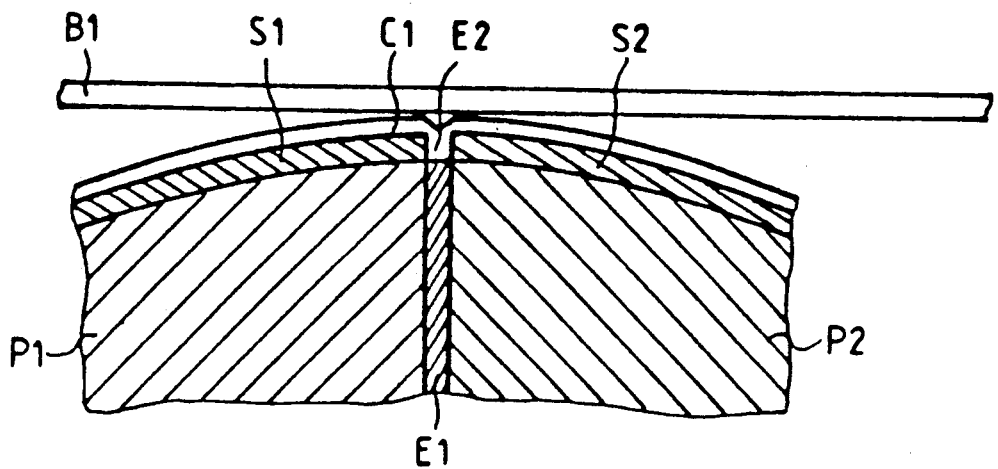
FIG_2
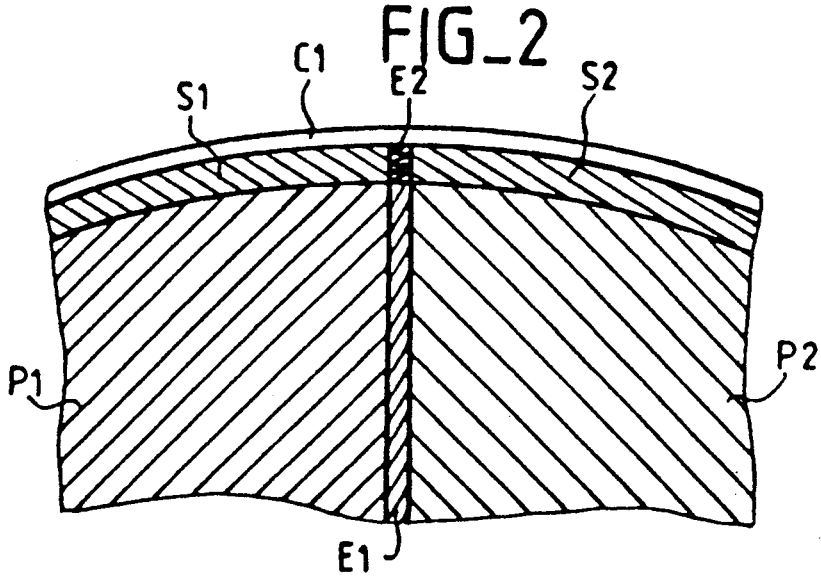
FIG_3
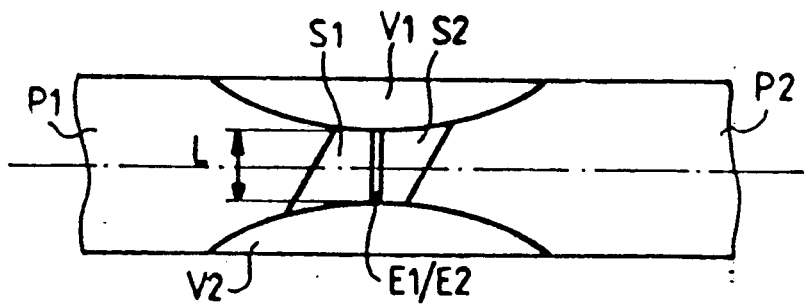

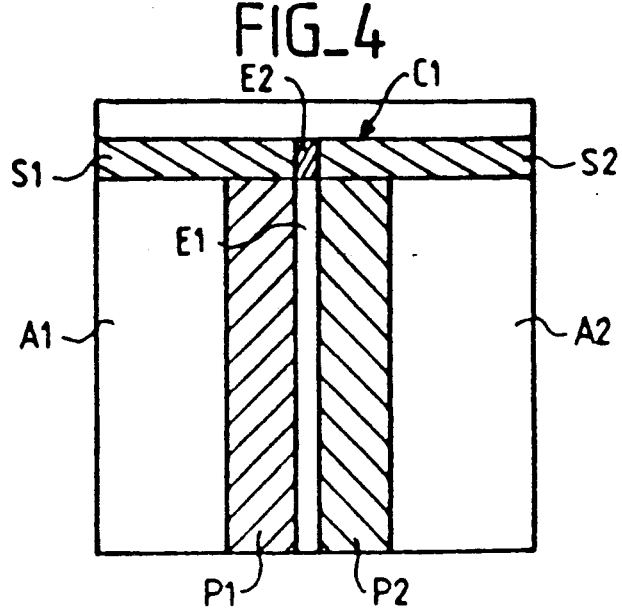
FIG_4
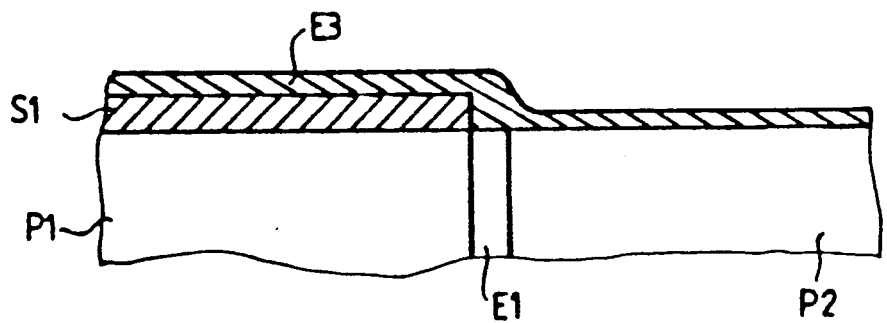
FIG_5
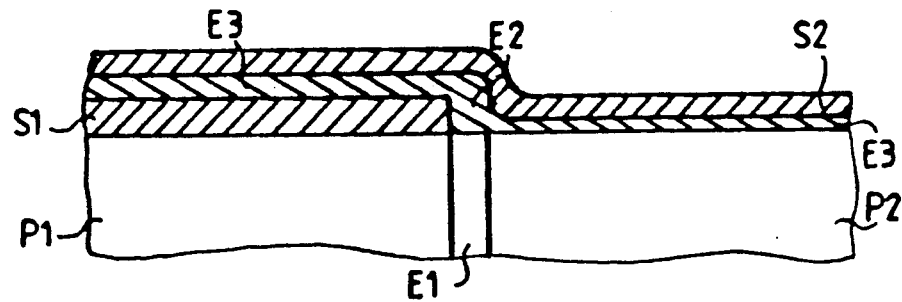
FIG_6
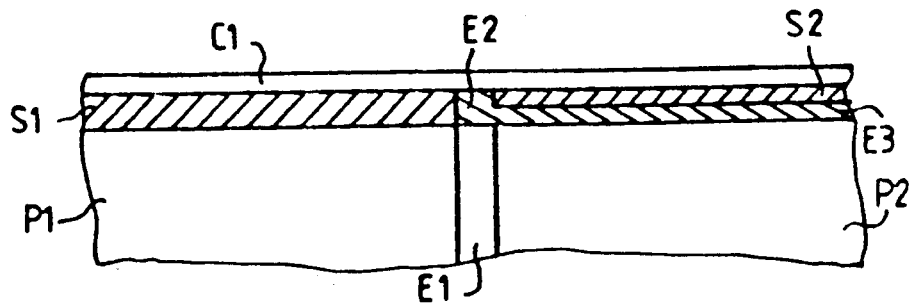
FIG_7

MAGNETIC RECORDING/PLAYBACK HEAD WITH ABRASION-RESISTING LAYER

BACKGROUND OF THE INVENTION

1. Field of the Invention

The present invention concerns a magnetic recording-playback head with abrasion-resisting layer and, more particularly, a magnetic head comprising, on its surface in contact with the magnetic recording medium, a wear-resisting layer. The invention also concerns a method for making an abrasion-resistant layer of this type.

2. Discussion of Background

Magnetic heads made with a ferrite substrate such as very high-definition heads for present-day video (VHS) applications, subjected to tape running at 5 ms$^{-1}$ or present-day digital heads (3.32 ms$^{-1}$) known as rotary digital audio tapes (RDAT) undergo slow erosion which makes them unusable at the end of 2000 hours of use. Throughout a working time such as this, the head may be worn out on a height of 20 micrometers.

One solution to the problem of wear is to deposit an abrasion-resisting layer on the head. Unfortunately, it is very difficult to make materials like carbon cling to ferrite, and, given the heterogeneity of the materials that might form a magnetic head, such as ferrite, alumina, glass, the carbon layer may prove to be difficult to deposit.

SUMMARY OF THE INVENTION

The invention enables the resolving of this problem of the deposition of an abrasion-resisting layer on a magnetic head and, notably, on the surface of the head in contact with a magnetic recording medium.

The invention therefore concerns a magnetic recording/playback head comprising two magnetic poles separated by a gap made of non-magnetic material, characterized in that it also comprises:
- on each magnetic pole, a layer of a magnetic material having a high coefficient of bonding on the magnetic poles, and on which a carbon-based layer has a high bonding coefficent;
- on all the layers of magnetic material and of the gap, an abrasion-resisting layer of a carbon-based material.

The invention also concerns a method for the fabrication of a magnetic recording/playback head according to any one of the preceding claims, characterized in that it comprises the following steps:
- a first step for the making, on the active face of one of the magnetic poles of the magnetic head, of a first clinging layer;
- a second step for the making, on the first clinging layer, on the gap and on the second magnetic pole, of a layer of a non-magnetic material;
- a third step for the making, on the layer of non-magnetic material, of a second clinging layer;
- a fourth step for the machining of the second clinging layer and of the layer of non-magnetic material until the first clinging layer is reached;
- a fifth step for the making, on the two clinging layers and on that part of the layer of non-magnetic material remaining between the two clinging layers, of a layer of abrasion-resisting material until the first clinging layer is reached.

BRIEF DESCRIPTION OF THE DRAWINGS

The different objects and characteristics of the invention will appear more clearly through the following description in referring to to the appended figures, which represent:

FIG. 1, an embodiment of a magnetic head according to the invention;

FIG. 2, a variant of the magnetic head of FIG. 1;

FIG. 3, a planar magnetic head according to the invention in a top view;

FIG. 4, a sectional view of a magnetic head in thin layers;

FIGS. 5 to 7, different steps of a fabrication method according to the invention.

DETAILED DESCRIPTION OF THE PREFERRED EMBODIMENTS

Referring to FIG. 1, we shall first describe an embodiment of a magnetic head according to the invention.

This magnetic head has two magnetic poles P1 and P2, made of ferrite-based magnetic material. The two magnetic poles P1, P2, are separated by a gap E1, made of alumina ($Al_2 A_3$) based or silica ($SiO_2$) based non-magnetic material.

A magnetic head of this type has to be covered with a layer of hard material, resistant to abrasion. A layer of this type may preferably be a carbon-based compound. However, it turns out that carbon clings poorly to ferrite.

According to the invention, as shown in FIG. 1, there is provision, on each magnetic pole, P1, P2, for a clinging layer S1, S2, made of magnetic material.

The material forming the layers S1, S2 has a composition such that it clings well to the ferrite of the magnetic poles S1, S2 and that the abrasion-resisting layer C1 also clings well to this material.

On the layers S1, S2, there is deposited an abrasion resistant layer C1, such as a carbon-based layer.

The invention provides, and this is important, for the layers S1, S2, to be made of magnetic material to prevent them from forming additional gaps. They should have the property of getting bonded efficiently to the magnetic poles and a carbon-based abrasion-resisting layer should also get bonded efficiently to these layers S1, S2.

According to the invention, the layers S1, S2, will be based on a material known in the prior art by the name Sendust. Sendust is a magnetic material with a general formula:

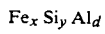

$$Fe_x Si_y Al_d$$

wherein, for example:
x is between 70 and 85 (about 80 for example)
y is between 5 and 15 (about 10 for example)
z is between 5 and 15 (about 10 for example)

It has been experimentally observed and verified that Sendust clings very well to ferrite as does carbon to Sendust. At the above mentioned compositions, it possesses the magnetic properties of ferrite. But any intermediate composition is possible. Notably, it is possible to add a fourth element such as carbon, which gives a general formula:

$$Fe_x Si_y Al_d C_t$$

wherein x+y+z+t=100 and wherein, the iron, silicon and aluminium compounds being substantially the same as previously, we have t between 0 and 15.

The layers S1, S2 could also be made of another magnetic material having the bonding properties described above. For example, this material could be Permalloy ($N_i F_e$).

The magnetic poles P1, P2, made of ferrite, being covered with clinging layers S1 and S2, an abrasion-resisting layer C1 covering the layers S1 and S2 will protect the magnetic head against wear from a magnetic recording medium such as a magnetic tape T1 running before the head and rubbing the abrasion-resisting layer C1.

In FIG. 1, it is to be noted that the clinging layers S1, S2, are separated, at the gap E1, by a space forming a gap E2. The abrasion-resisting layer C1 therefore fills this gap.

To prevent, as shown in FIG. 1, the surface of the abrasion-resisting layer C1 from having a hollow at the gap E2, there is provision for polishing the abrasion-resisting layer C1. There is also provision, according to the variant of FIG. 2, for the gap E2 to comprise a non-magnetic material such alumina $AL_2O_3$ or silica ($S_iO_2$) or a material based on one of these compounds. The surface of the abrasion-resisting layer C1 is then an even surface.

FIG. 3 shows a top view of a planar magnetic head. Two magnetic poles P1, P2, located on a substrate, face each other and are separated by a gap E1.

As earlier, the magnetic poles are covered with clinging layers S1, S2. These layers are separated by a gap E2 and the set is covered with an abrasion-resisting layer.

However, a planar head of this type should have a gap width L (1 to 3 microns) smaller than that of the substrate. The magnetic poles therefore have narrowed portions at the edges of the gap as shown in FIG. 3. The clinging layers S1, S2, should cover only the magnetic poles and should not run over on to the substrate bearing the poles, to prevent these clinging layers S1, S2, which are made of magnetic material, from increasing the width L of the gap E1 or from short-circuiting the gap E1.

The zones that are not covered by the magnetic poles P1, P2, on either side of the narrowed portions, are therefore occupied by a non-magnetic material V1, V2, such as a silica ($SiO_2$) based or alumina ($Al_2 O_3$) based material. This material is flush with the upper part of the clinging layers S1, S2, so as to form a smooth and level surface.

The set of clinging layers S1, S2, and non-magnetic material (V1, V2) is covered with the abrasion-resisting layer C1 (not shown in FIG. 3) as represented in FIG. 2. We obtain a planar magnetic head surface which is perfectly smooth and level and has high resistance to any wear due to friction against the recording medium.

The magnetic heads of FIGS. 1 and 2 may be of the type having metallic layers, on either side of the gap, of the MIG (metal in gap) type. The invention can be applied in the same way to magnetic heads of this type.

The invention is also applicable to a magnetic head in thin layers, such as is shown in FIG. 4. The magnetic head of FIG. 4 has two layers of magnetic material P1, P2, forming the magnetic poles. These layers P1, P2, are solidly joined to supporting materials A1, A2, such as alumina, and are separated by a gap E1. The active part of the magnetic head supports two clinging layers S1, S2, made of sendust, for example, separated by a gap E2. The set formed by the layers S1, S2, and the gap E2 is covered with an abrasion-resisting layer C1.

Referring to FIGS. 5 to 7 we shall describe a method for making the clinging layers S1, S2, and the abrasion-resisting layer C1 according to the invention.

The method of the invention is applied, in the following description, to any of the above described magnetic heads.

During a first step, on the active surface of a magnetic head having two magnetic poles, P1 and P2, separated by a gap E1 and, more particularly, on the active face of the pole P1, a clinging layer S1 is made, with a composition of the type described above.

During a second step, the layer S1 and the magnetic pole P2 are covered with a layer E3 of a non-magnetic material. We thus obtain a structure shown in FIG. 5.

During a third step, the layer P3 is covered with a layer S2 made of material identical to that of the layer S2 as shown in FIG. 6.

During a fourth step, the layers E3 and S2 are machined until the layer S1 is reached. There is then no more material of the layer E3 remaining on the magnetic pole S1. On the other hand, between the layers S1 and S2, a part of the layer E3 remains, forming a gap E2 between the layers S1 and S2.

During a fifth step, the set is covered with an abrasion-resisting layer C1. We thus obtain a structure such as the one shown in FIG. 7.

According to a variant of the method of the invention, if it is sought to prevent material of the layer E3 from remaining on the magnetic pole P2, there is provision, after the second step for making the layer E3, for a stage for etching the layer E3, leaving only the material needed to make the gap E2, so as to obtain an embodiment which is in accordance, for example, with FIGS. 2 and 4.

By way of example, the thickness of the Sendust-based clinging layer may be 100 angstroms, and that of the abrasion-resisting carbon-based layer may also be 100 angstroms.

It is quite clear that the above decription has been made only as a non-restrictive example. Other variants may be envisaged without going beyond the scope of the invention. The digital examples have been given solely to illustrate the description.

We claim:

1. Magnetic recording/playback head comprising two ferrite magnetic poles (P1, P2) separated by a gap (E1) made of non-magnetic material, said head further comprising:
    on the media confronting surface of each magnetic pole (P1, P2), a first layer (S1, S2) of a magnetic material having a high coefficient of bonding relative to the ferrite magnetic poles (P1, P2) and a carbon-based second layer formed on each said first layer and said gap said each second layer has a high bonding coefficient.

2. Magnetic recording/playback head according to claim 1, characterized in that said first layer of magnetic material is based on a composite of Fe, Si and Al.

3. Magnetic recording/playback head according to claim 1, characterized in that said first layer of magnetic material is based on Permalloy ($N_i F_e$).

4. Magnetic recording/playback head according to claim 2, characterized in that the first layer of magnetic material is based on $Fe_x Si_y Al_z C_t$, comprising the following proportions:

x = 70 to 85 per cent of iron;
y = 5 to 15 per cent of silicon,
z = 5 to 15 per cent of aluminum,
t = 0 to 15 per cent of carbon,
the sum x+y+z+t being equal to 100.

5. Magnetic recording/playback head, of planar shape according to claim 1, comprising said two ferrite magnetic poles (P1, P2) in thin layers deposited on a substrate (A1, A2) and separated by a said gap (E1), characterized in that said second layer also covers the media confronting zone or zones of said substrate not covered by the magnetic poles P1, P2 and the gap (E).

6. Magnetic recording/playback head according to claim 1, characterized in that the first layers (S1, S2) of magnetic material covering each ferrite magnetic pole (P1, P2) are separated from each other by second non-magnetic material (E2).

7. Magnetic recording/playback head according to claim 6, characterized in that said second non-magnetic material (E2) is a silica-based material.

8. Magnetic recording/playback head according to claim 6, characterized in that said second non-magnetic material (E2) is an alumina-based material.

* * * * *